United States Patent Office 3,484,352
Patented Dec. 16, 1969

3,484,352
METHOD OF PRODUCING A FOAMED AND/OR CROSS-LINKED POLYMER USING A RADIATION DECOMPOSABLE AGENT
Martin R. Cines and Robert A. Findlay, Bartlesville, Okla., assignors to Phillips Petroleum Company, a corporation of Delaware
No Drawing. Filed Mar. 31, 1965, Ser. No. 444,380
Int. Cl. C08f 1/16; C08d 1/00; B01j 1/10
U.S. Cl. 204—159.18                    9 Claims

ABSTRACT OF THE DISCLOSURE

A method for forming a foamed and/or cross linked polymer comprising providing a heated mixture of the polymer, blowing agent, and/or cross linking agent, the blowing and/or cross linking agents being of the type that absorbs energy of a wave length substantially different from the wave length of the energy absorbed by the polymer, and exposing the mixture to energy of a wave length substantially the same as the wave length which is absorbed by the blowing and/or cross linking agent.

---

This invention relates to a method for foaming and/or crosslinking a polymer or polymers.

Heretofore, in order to form a polymer foam by activating a blowing agent incorporated in the polymer, the nature of the materials used as blowing agents has been such that in order to activate these materials temperatures substantially above the softening point of the polymer had to be employed. The softening point as encompassed by this invention is that point determined by ASTM Test D-1525-58T. Due to this relatively high decomposition temperature of the blowing agents, the resulting foamed polymer had a somewhat heterogeneous structure because the polymer itself was too fluid to contain the gas bubbles formed in a uniform manner.

Heretofore, other problems of overheating of the polymer have been encountered in polymer crosslinking processes which required the thermal activation of a crosslinking agent.

It has now been found that a polymer or polymers can be foamed without substantially exceeding the softening point of same and notwithstanding the fact that the blowing agent employed decomposes at a temperature substantially above the softening point of the polymer or polymers. This is accomplished by employing in the polymer a blowing agent which absorbs radiant energy of a wave length substantially different from the wave length of the radiant energy absorbed by the polymer and by exposing the mixture of polymer and blowing agent to radiant energy of a wave length substantially the same as that which is absorbed by the blowing agent. By this manner of operation the blowing agent selectively absorbs the radiant energy and is therefore selectively heated to its decomposition temperature without heating the whole of the polymer substantially above its softening point. Since the polymer is not at a temperature substantially above its softening point, it has sufficient viscosity to contain the gas bubbles formed by decomposition of the blowing agent in a uniform manner.

It has also been found that thermally activated crosslinking agents which absorb radiant energy of a wave length substantially different from the wave length of the radiant energy absorbed by the polymer can also be employed together with or in lieu of the blowing agents above described. These crosslinking agents are activated in the same manner as the above blowing agents.

Accordingly, it is an object of this invention to provide a new and improved method of foaming and/or crosslinking a polymer or polymers.

Other aspects, objects and the several advantages of the invention will be apparent to those skilled in the art from the description and the appended claims.

According to this invention a polymer has incorporated therein in particulate solid or liquid form a blowing agent which decomposes and forms gas bubbles at temperatures substantially above the softening point of the polymer. The blowing agent can be incorporated in any conventional manner such as heating the polymer substantially to its melting point and then blending the blowing agent therewith, comminuting the polymer and then mixing the blowing agent with the polymer particles and the like.

One method for forming a suitable polymer and blowing agent mixture is disclosed in U.S. application Ser. No. 420,153, filed Dec. 21, 1964, now Patent No. 3,404,104 and of common assignee. This mixture is then heated, if necessary, substantially to the softening point of the polymer and preferably not exceeding 5° F. above the softening point. At this time the heated mixture is exposed to radiant energy of a wave length substantially the same as that absorbed by the agent in the polymer to decompose that agent. The mixture is preferably disposed in a mold having a configuration similar to that desired of the final polymer product. After exposure to the radiant energy, the polymer is cooled, e.g. below the softening point thereof, and recovered as a product of the process.

Generally, any polymer or mixtures of polymers which absorbs radiant energy in a definite wave length range can be employed in this invention. Preferred polymers are those which absorb the radiant energy of wave lengths other than in the 5.9–6.1 micron range. Preferred polymers are those formed from monomers or mixtures of monomers containing a terminal vinylidene group ($CH_2=<$) and containing from 2 to 10 carbon atoms per molecule. Still more preferred polymers are those formed from 1-olefins containing from 2 to 8 carbon atoms per molecule. Such olefins include ethylene, propylene, 1-butene, 4-methyl-1-pentene, 1-heptene, 1-octene, and the like. The polymers employed can be homopolymers or copolymers of two or more monomers.

The blowing agent can be any material which absorbs radiant energy in a definite wave length range and decomposes at temperatures substantially above the melting point of the polymer in which it is employed. Preferred blowing agents are those which absorb in the 5.9–6.1 micron radiant energy wave length range and decompose at a temperature at least 25° F. above the melting point of the polymer. Based on 100 parts by weight of the polymer, from about 0.01 to about 40, preferably from about 0.2 to about 2, parts of the blowing agent are generally used. Preferred blowing agents which absorb radiant energy in the 5.9–6.1 micron range are those containing a double bonded nitrogen group (—N=N—) and including the azo compounds such as azodicarbonamide (decomposes at from 320–390° F.), p,p-oxy-bis(benzenesulfonylhydrazine) (decomposes at 390–425° F.), barium azodicarboxylate (decomposes at 450° F.), and the like. Other conventional blowing agents are known in the art.

Radiant energy in the wave length range desired can be supplied in any conventional manner such as by providing a suitable filter for a conventional thermal radiator. Such filters include optical filters, solutions of the polymer to which radiant energy is to be exposed, alloys or other compound mixtures which absorb radiant energy at points both above and below the desired range, and the like. Other techniques include varying radiating surfaces and emission temperatures of the radiator. Those skilled in the art will know of other suitable techniques. Generally, the length of exposure of the polymer and blowing agent mixture to the radiant energy will vary from about 1 to about 60 minutes, preferably from about 5 to about 20 minutes, the primary requirement of the exposure intensity and length being that sufficient to heat the agent present to its decomposition temperature.

Crosslinking agents can be employed with or in lieu of the blowing agents above described and the use thereof will generally not alter the process above described. The crosslinking agent is incorporated into the polymer and the mixture exposed to radiant energy of the proper wave length. If no blowing agent is employed, the polymer containing the crosslinking agent can but need not be heated prior to exposure to the radiant energy. The crosslinking agent can be employed in amounts similar to those specified by the blowing agent.

Suitable crosslinking agents will be known to those skilled in the art and include sulfur, organic peroxides, and the like. The organic peroxides include alkyl peroxides, aralkyl peroxides, and the like. Specific crosslinking agents are di-tert-butyl perbenzoate, di-tert-butyl peroxide, di-cumyl peroxide and the like.

Other additives such as promoters, retarders and the like, can be employed in the polymer. Such materials include zinc oxide, barium stearate, magnesium oxide, and the like.

EXAMPLE

Polyethylene having a density of 0.960 gram per cubic centimeter and a melting point of 270° F. is ground to an average particle size of about 0.01 inch. About one part of azodicarbonamide per 100 parts of polyethylene is added to the subdivided polyethylene and is blended for about 10 minutes. The mixture is place in a mold and heated to a temperature of 270° F. and then exposed to radiant energy of a wave length range of from 5.9–6.1 microns. Radiant energy is formed by interposing between the heated mixture and a conventional thermal radiator a filter comprising polyethylene having a density of 0.960 gram per cubic centimeter and a melting point of about 270° F. The mixture is thus exposed for about 15 minutes after which it is cooled in the mold substantially to ambient temperatures. The foamed product is removed from the mold as a produce of the process and exhibits a substantially uniform cross section.

Although the invention has been described with reference to blowing and crosslinking agents, it is obvious that any type of thermal activation agent can be employed so long as it meets the wave length differential requirements relative to the polymer.

Reasonable variations and modifications are possible within the scope of this disclosure without departing from the spirit and scope thereof.

We claim:

1. A method for forming a foamed polymer comprising forming a mixture of a foamable polymer to be foamed and an effective foaming amount of a thermal decomposing blowing agent, said blowing agent being of a type that decomposes at a temperature substantially above the softening point of said polymer and that absorbs energy of a wave length substantially different from the wave length of energy absorbed by the polymer, heating said mixture of polymer and blowing agent substantially to, but not more than 5° F. above, the softening point of said polymer, and exposing said heated mixture to energy of a wave length substantially the same as the wave length which is absorbed by said blowing agent for a time sufficient to cause decomposition of said blowing agent and thereby cause foaming of a polymer without heating the polymer substantially over its softening point.

2. The method according to claim 1 wherein the polymer is formed from at least one monomer having a terminal vinylidene group and having from 2 to 10 carbon atoms per molecule, said blowing agent being of a type that decomposes at a temperature at least 25° F. above the softening point of said polymer.

3. A method for forming a foamed polymer formed from at least one 1-olefin monomer having from 2 to 8 carbon atoms per molecule comprising providing a mixture of a foamable polymer that is not substantially foamed and an effective foaming amount of a blowing agent, said blowing agent being of a type that decomposes at a temperature substantially above the softening point of said polymer and that absorbs radiant energy in the wave length range of from 5.9 to 6.1 microns, heating said mixture substantially to, but not more than 5° F. above, the softening point of said polymer, and exposing said heated mixture to radiant energy in the wave length range of from 5.9 to 6.1 microns to cause foaming of the polymer without heating the polymer substantially over its softening point.

4. The method according to claim 3 wherein said blowing agent contains at least one —N=N— group.

5. A method for forming formed polyethylene comprising providing a mixture of unfoamed polyethylene and an effective foaming amount of azodicarbonamide, heating said mixture substantially to the softening point of said polyethylene and no more than 5° F. above said softening point, and exposing said heated mixture to radiant energy having a wave length in the range of from 5.9–6.1 microns for a length of time sufficient to heat the azodicarbonamide to its decomposition temperature thereby forming a gas to cause foaming of the polyethylene without heating the polymer substantially over its softening point.

6. A method for forming a foamed and crosslinked polymer comprising providing a mixture of a foamable and crosslinkable polymer to be foamed and crosslinked, an effective foaming amount of a blowing agent and an effective crosslinking amount of a crosslinking agent, said blowing agent being of a type that decomposes at a temperature substantially above the softening point of said polymer and the blowing agent and crosslinking agent both being of a type that absorbs radiant energy of a wave length substantially different from the wave length of the radiant energy absorbed by the polymer, heating said mixture substantially to but not more than 5° F. above, the softening point of said polymer, and exposing said heated mixture to radiant energy of a wave length substantially the same as the wave length which is absorbed by said blowing agent and said crosslinking agent to cause foaming of the polymer without heating the polymer substantially over its softening point.

7. The method according to claim 6 wherein said polymer is formed from at least one monomer having a terminal vinylidene group and having from 2 to 10 carbon atoms per molecule.

8. A method for forming a crosslinked polymer comprising providing a mixture of a crosslinkable polymer that is not substantially crosslinked and an effective crosslinking amount of a crosslinking agent, said agent being of a type that activates at a temperature substantially above the softening point of said polymer and that absorbs radiant energy of a wave length substantially different from the wave length of the radiant energy absorbed by the polymer, heating said mixture substantially to the softening point of said polymer but no more than 5° F. above said softening point and exposing said heated mixture to radiant energy of a wave length substantially the same as the wave length which is absorbed by said crosslinking agent for a time sufficient to heat said crosslinking agent to its activation temperature and thereby cause crosslinking of the polymer without heating the polymer substantially over its softening point.

9. The method according to claim 8 wherein said polymer is formed from at least one monomer having a terminal vinylidene group and having from 2 to 10 carbon atoms per molecule, and said activation temperature of said crosslinking agent is at least 25° F. above the softening point of said polymer.

References Cited

UNITED STATES PATENTS 2,966,469   12/1960   Smythe et al. _____ 260—2.5
3,013,957   12/1961   Waddington.

MURRAY TILLMAN, Primary Examiner

R. B. TURER, Assistant Examiner

U.S. Cl. X.R.

204—159.2; 260—2.5